May 9, 1944. M. B. McDAVITT Re. 22,475

TELEPHONE SYSTEM,

Original Filed June 22, 1940 3 Sheets-Sheet 1

INVENTOR
M.B.MC DAVITT
BY R. O. Covell
ATTORNEY

May 9, 1944. M. B. McDAVITT Re. 22,475

TELEPHONE SYSTEM

Original Filed June 22, 1940 3 Sheets-Sheet 2

INVENTOR
M.B. MC DAVITT
BY
R.O. Covell
ATTORNEY

May 9, 1944. M. B. McDAVITT Re. 22,475

TELEPHONE SYSTEM

Original Filed June 22, 1940 3 Sheets-Sheet 3

INVENTOR
M.B.MC DAVITT
BY R. O. Covell
ATTORNEY

Reissued May 9, 1944

Re. 22,475

UNITED STATES PATENT OFFICE 22,475

TELEPHONE SYSTEM

Marcellus B. McDavitt, Hartsdale, N. Y., assignor to Bell Telephone Laboratories, Incorporated, New York, N. Y., a corporation of New York Original No. 2,291,481, dated July 28, 1942, Serial No. 341,815, June 22, 1940. Application for reissue June 26, 1943, Serial No. 492,466

18 Claims. (Cl. 179—18)

This invention relates to telephone systems and particularly to systems comprising subscriber controlled automatic switches for establishing connections between calling and called lines.

Objects of the invention are an increase in the flexibility, adaptability and efficiency of group selector switches and the trunking arrangements of telephone systems comprising such switches.

This invention is a selector switch comprising groups of terminals including one or more groups in which some of the terminals are connected to trunks of one group of trunks and other terminals are connected to trunks of another group of trunks, all trunks being tested by a single test brush. According to a feature of the invention, the busy testing circuit of the selector is arranged to test for an idle battery potential of one polarity when the brushes are hunting for an idle trunk in one of the groups of trunks in a selected terminal group and to test for an idle battery potential of the opposite polarity when hunting for an idle trunk in the other group of trunks connected to the selected terminal group.

Another feature of the invention is a selector directively operable to select a desired terminal group and automatically operable to hunt for an idle trunk in a selected terminal group, the selector having access to two groups of trunks in one or more terminal groups and arranged to test for an idle indicating potential of one polarity to select an idle trunk in one of the two groups and to test for idle indicating potential of the opposite polarity to select an idle trunk in the other of the two groups, the character of the idle indicating potential for which the selector tests being changed by a digit absorbing operation of the selector upon selection of a particular one of the terminal groups.

Another feature is a selector directively operable to select a desired terminal group and automatically operable to hunt for an idle trunk in a selected terminal group, the selector having access to two groups of trunks in one or more terminal groups and arranged to test for an idle indicating potential of one polarity to select an idle trunk in one of the two groups and to test for idle indicating potential of the opposite polarity to select an idle trunk in the other of the two groups, said selector being seizable over either one of two paths of access, the character of the idle indicating potential for which the selector tests being dependent upon the path through which the selector is seized. A further feature of such a selector is an arrangement whereby selection of a particular group of terminals effects a digit absorbing operation of the selector without affecting the character of the idle indicating potential for which the selector tests.

Another feature of the invention is a selector directively operable to select a desired terminal group and automatically operable to hunt for an idle trunk in a selected terminal group, the selector having access to two groups of trunks in one or more terminal groups and arranged to test for idle indicating potential of one polarity to select an idle trunk in one of the two groups and to test for idle indicating potential of the other polarity to select an idle trunk in the other of the two groups, the selector being arranged to absorb a first digit by return to normal after response to the first train of directive impulses, the character of the idle indicating potential for which the selector tests being dependent upon the numerical value of the absorbed digit.

Another feature of the invention is an arrangement in which the trunks in one group connected to terminals in a terminal group of a selector bank are arranged to mark the associated test terminals by an idle battery potential of one polarity and the trunks in another group connected to terminals in the same terminal group of the selector bank are arranged to mark the associated test terminals by an idle battery potential of the opposite polarity.

A clear and complete understanding of the invention will be facilitated by considering a system and selectors in which the invention is embodied, one such system being shown schematically in the drawings which forms a part of this specification.

Referring to the drawings.

Figure 1:
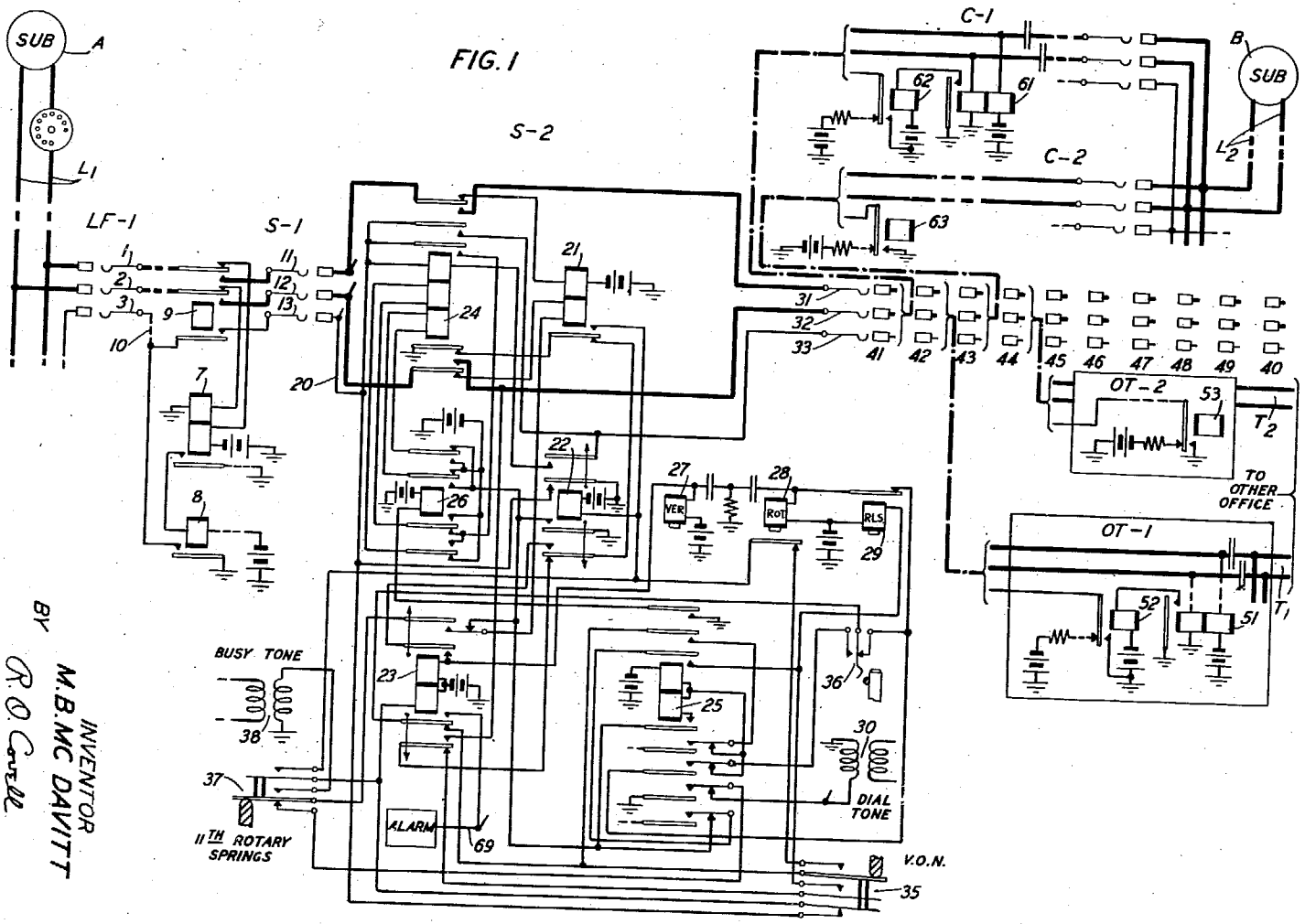
Fig. 1 shows a calling subscriber's station A and line L1, a line-finder switch LF—1, selectors S—1 and S—2, outgoing trunk circuits OT—1 and OT—2, connector switches C—1 and C—2 and a called subscriber's line L2 and station B.

While only two selectors are shown as being included in a connection between a calling and a called line, it is understood that additional intermediate selectors may be included, the total number of switches required for establishing connections between calling and called lines depending upon the number of lines and the number of digits in the telephone numbers assigned to the subscribers.

The subscribers' stations A and B may be of known type, each comprising a dial or other impulse sender for controlling the operation of selector switches. Each of the line-finder selector and connector switches may be of the well-known two-motion step-by-step type and reference may be had to the second edition of "Automatic Telephony," by Smith and Campbell, pages 53 to 65, inclusive, for a description of the structure of such switches and their operation when used as selectors and connectors. Reference may be had to the patent to R. L. Stokely, No. 1,799,654, granted April 7, 1931, for a description of the operation of such switches when used as line finders. Each of the line-finder and connector switches is represented in the drawings by a set of brushes and a single set of terminals, all operating magnets, relays and other associated apparatus being omitted.

The selector S—1, with which the line finder LF—1 is permanently associated, is represented in the drawings by its brushes 11, 12 and 13, the single set of terminals to which the selector S—2 is connected, its line relay 7, release relay 8, and the test and cut-through relay 9. The operating magnets and other associated apparatus are omitted. This selector is arranged to test for idle battery potential and it is, in this respect, similar to the selector S—1 shown in Fig. 1 of the patent to N. H. Saunders, No. 1,868,994, granted July 26, 1932.

The selector S—2, which is shown in detail, comprises a set of brushes 31, 32, 33, a bank of terminals consisting of ten levels, each level having ten sets of three terminals each, only one level being shown, a vertical-stepping magnet 27, a rotary-stepping magnet 28, a release magnet 29, vertical off-normal springs 35, shaft-operated springs 36 adjusted to be operated when the brushes have been raised to a particular level, eleventh rotary-step springs 37, a line relay 21, release relay 22, change-over relay 23, cut-through and test relay 24, and test control relays 25 and 26. Two groups of trunks are connected to the terminals 40 to 49, inclusive, of the level shown in the drawings. A first group of trunks connect the odd-numbered terminal sets of the level shown to connector switches, including the switches C—1 and C—2. A second group of trunks connect the even-numbered terminal sets to outgoing trunk circuits and interoffice trunks, including the trunk circuits OT—1 and OT—2. Although one group is shown as an interoffice group of trunks and the other as a local group of trunks leading directly to connector switches, each of the two groups of trunks connected to terminals in one level of the bank may be of any desired character. Furthermore, the local group of trunks may terminate in intermediate selector switches instead of leading directly to connector switches. Each of the levels of the bank of switch S—2, with the exception of the particular level with which the contact springs 36 are operatively associated, is arranged in similar manner to give access to two groups of trunks.

To enable the testing of trunks in either one of two groups of trunks in a level with only one test brush the testing circuit of selector S—2 is arranged to effect seizure of a trunk in one group when the test brush encounters an idle battery potential of one polarity and to effect seizure of a trunk in the other group when the test brush encounters an idle battery potential of the opposite polarity, each trunk being arranged to connect idle battery potential of the required polarity to the test terminal when the trunk is idle. The test and cut-through relay 24 has a polarizing winding which is energized upon seizure of the selector to prepare the relay for operation when the test brush 33 encounters a negative idle battery potential. Upon selection of a level, other than the level with which contact springs 36 are operatively associated, in response to the first train of dial impulses, the switch proceeds to select the first idle trunk in the group connected to the even-numbered terminals of the selected level. If, however, the brushes are advanced in response to the first train of impulses to the level on which springs 36 are actuated, relays 25 and 26 are actuated to effect the restoration of the brushes to normal and to reverse the current in the polarizing winding of the test and cut-through relay 24. With relay 24 polarized in the opposite direction, it is prepared to test for and operate upon encountering a positive idle battery potential and the switch will operate to select the first idle trunk in the group connected to the odd-numbered terminals of the level selected responsive to the next train of impulses incoming to the switch.

The outgoing trunk circuits OT—1 and OT—2 associated with interoffice trunks T—1 and T—2 are similar to the outgoing repeater circuit shown in Fig. 67 and described on pages 70 to 72 inclusive of the aforementioned second edition of "Automatic Telephony," except that the test conductor of the repeater is normally connected through a back contact of the release relay to negative battery potential. The necessary modification of the repeater circuit for use as outgoing trunk circuit OT—1 is shown, relay 51 being the line relay of the repeater and relay 52 being the release relay which normally connects negative battery potential to the test terminal of trunk circuit OT—1 in the bank of switch S—1. When relays 51 and 52 are operated due to seizure of this trunk circuit, the idle battery potential is disconnected and a busy indicating, and holding, ground potential is connected to the test terminal. The outgoing trunk circuit OT—2 and other trunk circuits in the group are arranged in similar manner.

The connector circuits C—1 and C—2 and the other connectors in the same group are each arranged to normally connect a positive battery potential to the test terminals of the sets associated with these connectors and to connect a busy indicating, and holding, ground potential to these terminals when the connector is in use. A connector circuit arranged to provide an idle battery potential is disclosed in Fig. 5 of the patent to W. H. Paulett et al. No. 1,823,665, granted September 15, 1931. Although a negative idle battery potential is shown in this patent, it is obvious that a positive idle battery potential might be substituted.

Assume now that a call is originated at station A, and that the line L1 is connected by a line finder LF—1 to the selector switch S—1, that the selector S—1 is operated in usual manner in response to the first train of impulses from the calling subscriber's dial to select a corresponding level and an idle trunk therein, and that the selected terminals are the ones connected to the second selector S—2, the terminal with which test brush 13 engages being normally connected through conductor 20, back contact of the vertical off-normal springs 35 and lower winding of relay 23 to battery. When the test and cut-through relay 9 of the selector S—1 operates, it disconnects the line relay 7 from the calling line and the release of relay 7 opens the circuit through the winding of relay 8; but relay 8 is slow in releasing and prior to the release of relay 8, ground is connected through its front contact, a front contact of relay 9, brush 13, conductor 20, back contact of the vertical off-normal springs 35, to the lower winding of relay 23 to operate relay 23. The operation of relay 23 closes a circuit for operating the line relay 21. This circuit is traced from battery through the upper winding of relay 21, upper back contact of relay 24, brush 11 of selector S—1, a front contact of relay 9, brush 1 of line finder LF—1, conductors of line L1 and telephone set at station A, brush 2 of line finder LF—1, a front contact of relay 9, brush 12 of selector S—1, a lower back contact of relay 24, lower winding of relay 21, a front contact of relay 23, a back contact of the eleventh rotary-step springs 37, a back contact of relay 25, and through the left winding of dial tone source 30 to ground. The dial tone source is provided primarily for use when this switch is used as a first selector. If no dial tone is needed, as in the present case where the switch is used as a second selector, the aforementioned back contact of the eleventh rotary-step springs may be connected directly to ground. In either case, relay 21 is operatively energized and closes a circuit for operating release relay 22. Relay 22 connects ground potential to conductor 20 before relay 8 of selector S—1 releases, thereby maintaining the operation of relay 23 and also holding relay 9 of selector S—1 and the line finder LF—1 in usual manner. Relay 22 also closes a circuit for energizing the lower polarizing winding of test relay 24 but this energization is insufficient to operate relay 24.

No further operation takes place until the calling subscriber dials the second digit of the number of the called subscriber's station. If no dial impulses are received, an alarm is effected, after the lapse of a predetermined interval of time, due to the connection of alarm conductor 69 through a front contact of relay 23, normally closed contact of springs 36, back contact of release magnet 29 and through the winding of rotary-stepping magnet 28 to battery. Magnet 28 is marginal and does not operate in the circuit through alarm conductor 69.

When the second digit is dialed, relay 21 is released and reoperated as many times as there are impulses in the train created by the operation of the subscriber's dial. The release of relay 21, in response to the first impulse, closes a circuit including a back contact of relay 24 and a front contact of relay 22 for energizing the upper, locking winding of relay 23 and the winding of the vertical-stepping magnet 27, in parallel. The operation of magnet 27 steps the brushes 31, 32 and 33 up to the first level of the terminal bank. The vertical off-normal springs 35 are actuated as soon as the shaft and brushes are moved out of normal position thereby opening the circuit through the lower winding of relay 23. When relay 21 reoperates at the end of the impulse, the stepping magnet 27 immediately releases; but relay 23 is slow in releasing, and its locking circuit will be again closed by the release of relay 21 in response to each succeeding impulse of the train so as to hold relay 23 operated until all of the impulses in the train have been received. Relay 22 is also slow in releasing and for this reason does not release during the response of relay 21 to dial impulses. The vertical-stepping magnet is reoperated each time relay 21 releases thereby stepping the brushes into alignment with the level corresponding to the digit dialed.

When relay 23 releases, after all of the impulses in the first train incoming to switch S—2 have been received, and if the selected level is one other than that with which contact springs 36 are operatively associated, a circuit is closed for operating the rotary-stepping magnet 28. This circuit includes a back contact of release magnet 29, normally closed contact of springs 36, a back contact of relay 23, upper front contact of the vertical off-normal springs 35, a back contact of magnet 28, front contact of relay 21 and back contact of relay 24. The operation of magnet 28 opens its own energizing circuit and steps the brushes into engagement with the first set of terminals in the selected level, which we will assume is the level shown in the drawings. Test brush 33 is connected through an upper front contact of relay 22, to and through the upper, operating winding of relay 24, through conductor 20, to ground at a front contact of relay 22. If the connector C—1, which is connected to terminal set 41, is busy, the test terminal engaged by brush 33 is connected to ground at a front contact of the release relay 62; and there is, therefore, no current through the upper winding of test relay 24. If the connector C—1 is idle, positive battery potential is connected through the back contact of the release relay 62 to the terminal engaged by brush 33 and although there is a current through the upper winding of relay 24, this current is in the direction which opposes the polarizing winding. In either case, test relay 24 does not operate. If relay 24 does not operate, the release of stepping magnet 28 again closes its energizing circuit and the magnet is reoperated to step the brushes into engagement with terminal set 42. If trunk T1 is idle, release relay 52 of outgoing repeater circuit OT—1 is normal and a negative idle indicating battery potential is connected through the back contact of relay 52 to the terminal engaged by brush 33; and the upper winding of relay 24 is energized by current in the direction which aids the current through the polarizing winding and relay 24 operates. If, however, trunk T1 is busy, relay 52 is operated and ground potential is connected through its front contact to the terminal engaged by brush 33 and relay 24 does not operate. If trunk T1 is busy and relay 24 does not operate, the rotary-stepping magnet 28 reoperates to step the brushes to terminals 43. The brushes are thereupon advanced another step, irrespective of whether connector C—2 is busy or idle, to terminals 44. In this manner the stepping of brushes 31, 32 and 33 is continued to select an idle outgoing trunk circuit; and when an idle trunk is found, brush 33 encounters a negative idle indicating battery potential and relay 24 is operated. If all of the trunks connected to the even-numbered terminals are busy, the brushes are advanced beyond the last set of terminals to an eleventh rotary position in which springs 37 are actuated to connect the right winding of busy tone source 38 to the lower winding of relay 21 and thus transmit an all-trunks-busy signal to the calling subscriber. The springs 37 also connect the lower winding of relay 23 in parallel with the winding of relay 22 so that relay 23 reoperates thus again closing the alarm circuit through conductor 69 to cause an alarm if the connection is not released by the calling subscriber within a predetermined interval of time after the all-trunks-busy condition is encountered.

Assuming the trunk T1 to have been idle when tested by relay 24, the operation of relay 24 prevents the further operation of stepping magnet 28, opens the energizing circuit of relay 22, disconnects relay 21 from the calling line and connects the calling line through brushes 31 and 32 to the windings of the line relay 51 of the outgoing trunk circuit OT—1. Relay 51 closes a circuit for operating release relay 52 and relay 52 connects ground to the terminal engaged by brush 33 to prevent seizure of trunk T1 by another selector. This ground is further connected through brush 33 and a front contact of relay 24 to conductor 20 to hold the selector S—1 and line finder LF—1 after relay 22 releases. The release of relay 22 opens the circuits through the operating and polarizing windings of relay 24 and relay 24 is now held operated by the energization of its middle winding in a circuit traced from battery through a lower back contact of relay 26, middle winding of relay 24, another back contact of relay 26, and a front contact of relay 24 to conductor 20 and the holding ground potential thereon.

The impulses created by the dialing of the remaining digits of the called subscriber's number are repeated by relay 51 of outgoing trunk circuit OT—1 in usual manner, the desired connection being thereby completed. When the connection is released by the calling subscriber, relays 51 and 52 release. The release of relay 52 disconnects holding ground potential from the terminal engaged by brush 33, thereby causing the release of relay 24 of selector S—2, the release of relay 9 of selector S—1 and release of the line finder LF—1. The line finder LF—1 and selector S—1 are restored to normal in usual manner. The release of relay 24 closes a circuit including back contacts of relays 24, 21, 22 and 23 and the middle contact of springs 35 for operating release magnet 29. The operation of magnet 29 restores the shaft and brushes to normal. When the shaft reaches normal, the vertical off-normal springs 35 are restored to normal and magnet 29 releases.

Assume next that the level selected in response to the first train of dial impulses incoming to selector S—2 is the level with which contact springs 36 are operatively associated. In this case the operation of springs 36 opens the circuit for operating the rotary-stepping magnet 28; and when relay 23 releases, a circuit is closed for operating relay 25. This circuit includes the upper winding of relay 25, a back contact of relay 25, the normally open contact of springs 36, a back contact of relay 23, upper contact of vertical off-normal springs 35, back contact of magnet 28, front contact of relay 21 and a back contact of relay 23. The energization of the upper winding of relay 25 is effective to close the inner lower front contact and the inner and middle upper front contacts of relay 25 without affecting any of the other contacts. The closing of the middle upper front contact of relay 25 closes a locking circuit for its upper winding independent of springs 36. The closing of the inner lower front contact of relay 25 connects its lower winding to ground at a front contact of relay 22 but the lower winding is short-circuited through the left contacts of springs 36 and also through the upper contact of vertical off-normal springs 35.

The closing of the inner upper front contact completes a circuit for operating release magnet 29, which circuit also includes a lower back contact of relay 25 and the inner lower front contact of relay 22. The operation of release magnet 29 restores the brushes to normal. Springs 36 are restored to normal as soon as the brushes leave the level in question, and when the shaft reaches normal the vertical off-normal springs 35 are restored to normal. Both of the short circuits around the lower winding of relay 25 are thereby opened and relay 25 is now fully actuated and locked by the energization of both of its windings in series to ground at the inner lower front contact of relay 22. The complete operation of relay 25 causes the release of release magnet 29, closes a circuit for operating relay 26, disconnects the upper winding of relay 25 from the front contact of springs 36 and connects the back contact of springs 36 to the front contact, thereby rendering springs 36 ineffective during the further operation of the selector. When used as a first selector with the dial tone connection, the complete operation of relay 25 also disconnects the dial tone source. The operation of relay 26 reverses the connections between the polarizing winding of relay 24 and battery so that the polarizing winding is now energized in a direction which renders this relay operatively responsive only to the energization of its upper, operating winding when test brush 33 encounters a positive idle indicating battery potential. The operation of relay 26 also reverses the connections between battery and the middle or holding winding of relay 24 so that when this relay operates the middle winding will be energized in the same direction as its operating winding to hold the relay after its operating and polarizing circuits are opened by the release of relay 22.

The selector is now ready for response to the train of impulses created by the dialing of the next digit of the called subscriber's number. Relay 21 and stepping magnet 27 effect the selection of the level corresponding to this digit in the manner above described. If the level with which springs 36 are associated is again selected the resulting operation is no different from that which occurs if some other level is selected since in either case the release of relay 23, after the last impulse has been received, closes the circuit for operating rotary-stepping magnet 28. This circuit includes the back contact of springs 36 if these springs are not actuated and includes a front contact of relay 25 and the front contact of springs 36 if these springs are actuated and is otherwise similar to the circuit hereinbefore traced for operating the magnet 28. The first operation of magnet 28 steps the brushes into engagement with terminals 41; and if the associated connector C—1 is idle, the positive idle battery potential connected through the back contact of release relay 62, to the test terminal engaged by brush 33, causes the energization of the upper winding of relay 24 in the same direction as its polarizing winding and relay 24 operates to prevent further stepping. If connector C—1 is busy, ground potential is connected through the front contact of release relay 62 to the test terminal engaged by brush 33 and there is, therefore, no current through the upper winding of relay 24; and in this case, magnet 28 is reoperated, after its release due to the opening of its operating circuit by its own interrupter contact, to step the brushes to the terminals 42. Brush 33 now encounters a ground potential if the interoffice trunk OT—1 is busy and encounters a negative idle battery potential if this trunk is idle. In the one case the operating winding of relay 24 is not energized and in the other it is energized in the opposite direction to its polarizing winding, and in either case relay 24 does not operate, so that magnet 28 is again energized to step the brushes to terminals 43. The advance of the brushes is in this manner continued until brush 33 encounters a positive idle battery potential whereupon relay 24 is operated and the idle connector is seized. If no idle connector is found the brushes are advanced to the eleventh rotary position and a busy tone is transmitted to the calling station as hereinbefore described. If an idle connector is found, the operation of relay 24 disconnects the calling line from relay 21 and connects the line through brushes 31 and 32 to operate the line relay of the selected connector. Assuming connector C—1 to have been selected, line relay 61 operates closing a circuit for operating release relay 62. Relay 62 disconnects idle battery potential from the test conductor and connects ground potential thereto to prevent seizure by another selector and to hold relay 24 and to hold the selector S—1 and line finder LF—1 in usual manner. The release of relay 21 opens the operating circuit of relay 22, and the release of relay 22, which occurs after the connection of holding ground potential by the release relay 62 of the seized connector to the test conductor, causes the deenergization of the polarizing winding of relay 24 and the release of relays 25 and 26 in succession. The connection is completed under the control of the calling subscriber and maintained until the calling subscriber restores the station to normal, whereupon the line relay 61 releases, causing the release of relay 62 and the disconnection of the holding ground potential whereby the selectors S—2 and S—1 and line finder LF—1 are restored to normal as hereinbefore described.

Figure 2:
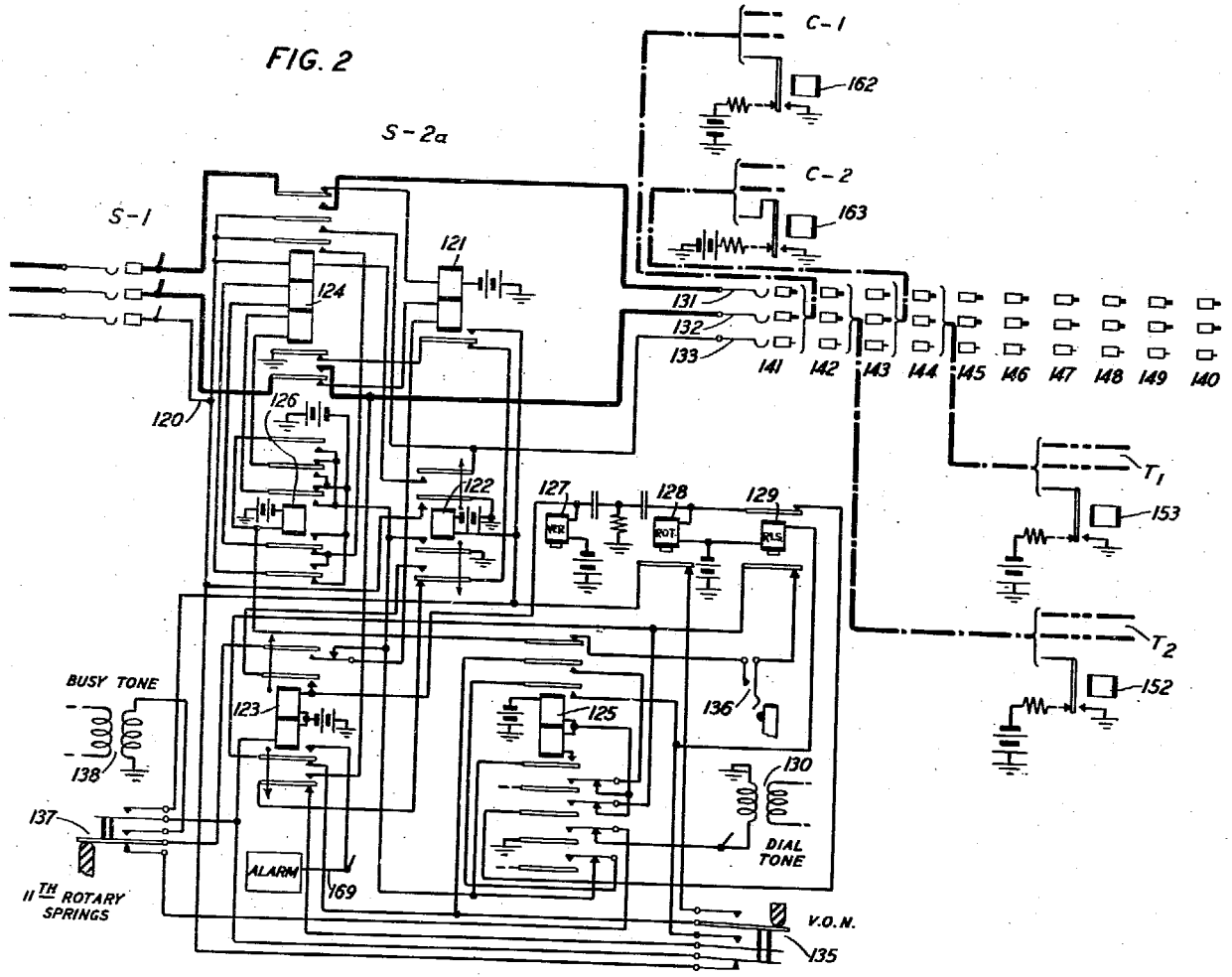
Fig. 2 shows a selector S—2*a* and Fig. 3 shows a selector S—2*b*, each of which selectors are arranged in accordance with features of the invention.

The selector S—2*a* shown in Fig. 2 is similar to selector S—2 shown in Fig. 1 except that it always absorbs the first digit dialed. The various elements of the selector S—2*a* are identified by reference numbers whose tens and units digits are the same as the corresponding elements of the selector S—2 of Fig. 1. Relay 125 is operated at the end of the first digit to effect the return of the brushes to normal. If the absorbed digit is one which does not effect the operation of springs 136, relay 126 is not actuated and the lower polarizing winding of relay 124 is energized to render relay 124 operatively responsive to negative idle battery potential; but if the absorbed digit is the one which effects selection of the level with which springs 136 are associated, the actuation of these springs causes the operation of relay 126 so as to reverse the energization of the polarizing winding of relay 124 to render relay 124 operatively responsive to positive idle battery potential.

Upon seizure of selector S—2*a* by a selector S—1, relays 123, 121 and 122 operate in the manner hereinbefore described for the corresponding relays of selector S—2. Relay 121 and the vertical-stepping magnet 127 effect the advance of the brushes to select the level corresponding to the first train of impulses dialed after seizure of selector S—2*a*. When relay 123 releases, after relay 121 reoperates at the end of the last impulse of the train, it closes a circuit for operatively energizing the upper winding of relay 125. This circuit includes back contacts of relays 125 and 123, the upper front contact of vertical off-normal springs 135, a back contact of rotary-stepping magnet 128, a front contact of relay 121 and a back contact of relay 124. If the brushes have been advanced to the level associated with springs 136, the release of relay 123 also closes a circuit for operating relay 126; this circuit includes the upper back contact of relay 125, the contact of springs 136, a back contact of release magnet 129, a back contact of relay 123, the upper contact of the vertical off-normal springs 135, back contact of rotary-stepping magnet 128, front contact of relay 121, and a back contact of relay 124. When relay 125 is thus partially energized by its upper winding, the inner lower and two inner upper front contacts of relay 125 are actuated without affecting the other contacts of this relay. A circuit for operating the release magnet 129 is closed at one of the actuated upper front contacts of relay 125, causing the return of the brushes to normal. The operation of release magnet 129 opens the operating circuit of relay 126; but, if already operated, relay 126 is held operated by a locking circuit under the sole control of relay 122. At its middle upper front contact, relay 125 closes a holding circuit through its upper winding, the lower winding being short-circuited until springs 135 are restored to normal. If actuated, the springs 136 are restored to normal as soon as the brushes leave the level with which the springs are associated. When the brushes reach normal position, the vertical off-normal springs 135 are restored to normal thereby opening the holding circuit through the upper winding of relay 125 and causing the energization of both windings of relay 125 in a circuit through its inner lower front contact to ground at the inner lower front contact of relay 122. Relay 125 is completely operated by the energization of both of its windings in series, thereby opening the aforementioned operating and holding circuits for its upper winding and opening the operating circuit of release magnet 129.

In response to the impulses created by the dialing of the next digit of the called subscriber's number, relay 121 and stepping magnet 127 effect the selection of a corresponding level. If this level is the one with which springs 136 are operatively associated, the actuation of these springs is nevertheless ineffective since relay 125 was operated and locked in response to the absorbed digit. When relay 123 releases, after the last impulse of this train has been received, it closes a circuit for operating the rotary-stepping magnet and trunk hunting now occurs to select a trunk in the manner hereinbefore described for selector S—2 in one of the two groups of the selected level depending upon whether relay 126 was operated and locked responsive to the absorbed digit.

When trunk selection is completed and relay 124 operates, relays 121, 122 and 125 release, relay 124 being held by the energization of its middle winding through the test brush 133 in the manner hereinbefore described for holding relay 24 of selector S—2. If operated, relay 126 releases when its locking circuit is opened by the release of relay 122. The desired connection is completed and held under control of the calling station. When the calling subscriber releases the connection, the holding ground is disconnected from the terminal engaged by brush 133 thereby effecting the release of relay 124, the operation of release magnet 129, and the return of selectors S—2a and S—1 and line finder LF—1 to normal.

Figure 3:
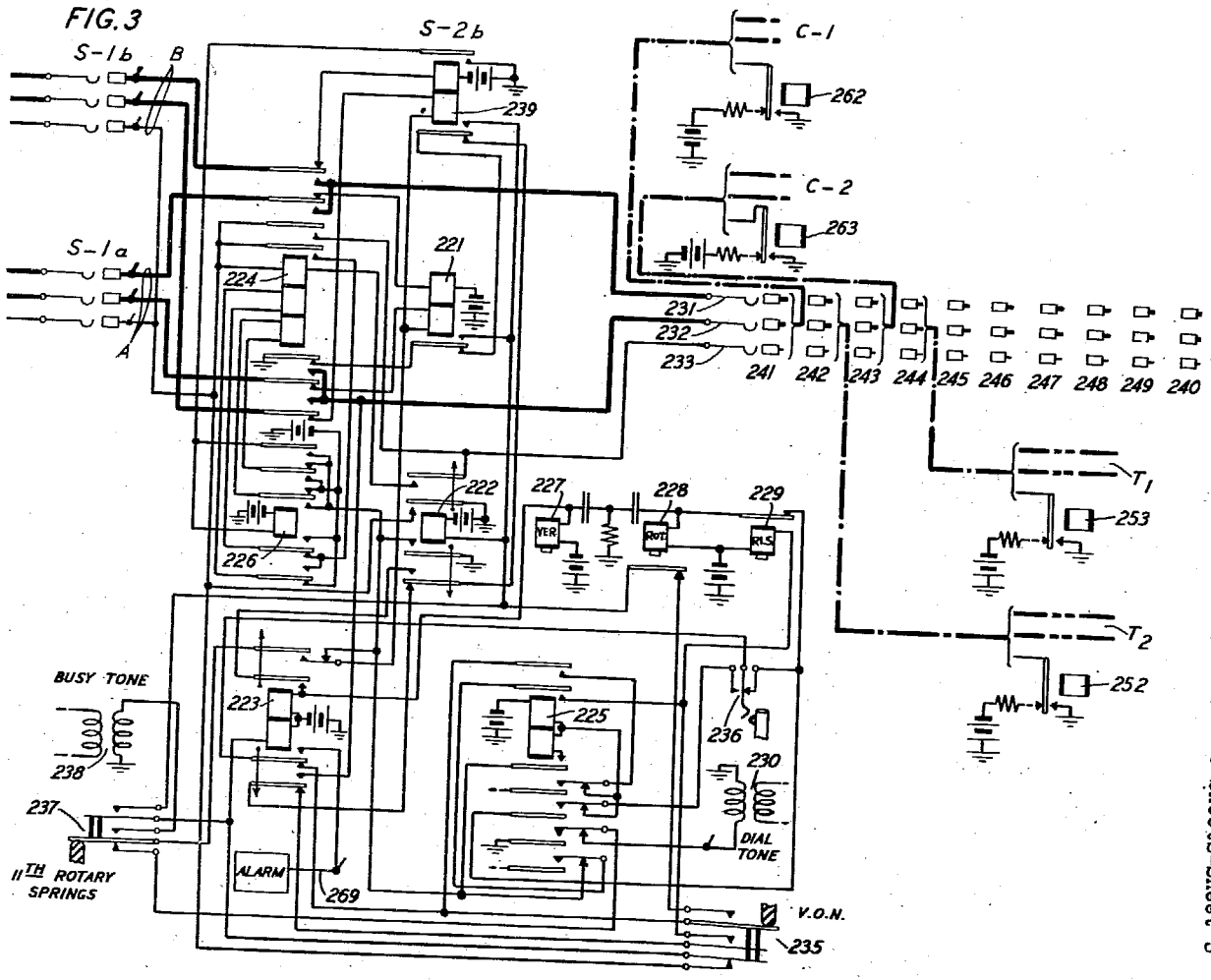

The selector S—2b shown in Fig. 3 is similar to the selector S—2, shown in Fig. 1, in that it is arranged to hunt for either positive or negative idle indicating battery potential. It differs, however, from the selector S—2 in that it is arranged for seizure through either one of two paths of access, the test relay being polarized in one direction if the selector is seized over one path and in the other direction if the selector is seized over the other path of access. As shown in Fig. 3, the incoming conductors A are connected to a set of terminals in the bank of a first selector S—1a and other selectors in the same group; and the conductors B are connected to a set of terminals in the bank of a first selector S—1b and the other selectors in another group. The conductors A and B may, however, be connected to terminals in the banks of selectors other than first selectors or to terminals in two levels of the switches in one group. The selector S—2b has two line relays, the added line relay being relay 239. The other elements of this selector are identified by reference numbers whose tens and units digits are the same as the corresponding elements of selectors S—2 of Fig. 1 and S—2a of Fig. 2. If the selector S—2b is seized through conductors A, the line relay 221 controls the selective response to dial impulses, relay 226 is not operated, and the test relay 224 is polarized in the direction which renders this relay operative by energization of its operating winding when the test brush encounters negative idle battery potential. If the selector is seized through conductors B, the line relay 239 controls the selective response to dial impulses. The operation of relay 239 closes the circuit for operating relay 226 and relay 226 locks under control of relay 222. With relay 226 operated, the test relay 224 is polarized in the direction which renders this relay operative by energization of its operating winding when the test brush encounters positive idle battery potential. Except for the different control of relay 226, the selector S—2b is otherwise operatively the same as selector S—2, relay 225 and contact springs 236 being effective to absorb the first digit if this digit effects the selection of the level with which springs 236 are operatively associated.

What is claimed is:

1. In an automatic switch having a bank of terminals divided into groups and having access to two groups of trunks in each of a plurality of groups of terminals, a switching relay having an operating winding and a polarizing winding, means for energizing said polarizing winding in one direction to enable selection of a trunk in one of the two groups in any one of said plurality of groups of terminals, means for energizing said polarizing winding in the other direction to enable selection of a trunk in the other of the two groups in any one of said plurality of groups of terminals, means responsive to directive control for positioning said switch in selective relation to any one of said plurality of groups of terminals, means for automatically operating the switch to hunt for an idle trunk in the one or the other of said two groups of trunks in a selected group of terminals, means for energizing the operating winding of said relay in the same direction as the polarizing winding responsive to the switch finding an idle trunk in the desired one of the two trunk groups in the selected one of said plurality of groups of terminals, and means comprising said relay for terminating the automatic operation of the switch and for effecting the seizure of the first idle trunk in the desired trunk group.

2. In an automatic switch having a bank of terminals divided into groups and having access to groups of trunks including two groups of trunks through one of said groups of terminals, a switching relay having an operating winding and a polarizing winding, means responsive to directive control for positioning said switch in selective relation to any one of said groups of terminals, means for automatically operating the switch to hunt for an idle trunk in a selected group of terminals, means for energizing said polarizing winding in one direction to enable selection of a trunk in one of said two groups of trunks and in the opposite direction to enable selection of a trunk in the other of said two groups of trunks, means for energizing the operating winding of said relay in the same direction as the polarizing winding to effect the operation of said relay responsive to the switch finding an idle trunk in the desired one of said two groups of trunks, and means comprising said relay for terminating the automatic operation of the switch and for effecting the seizure of the first idle trunk in the desired one of said groups of trunks.

3. In an automatic switch having a bank of terminals divided into groups and having access to groups of trunks including two groups of trunks through one of said groups of terminals, means responsive to directive control for operating said switch to select any one of said groups of terminals, means for automatically operating the switch to hunt for an idle trunk in a selected group of terminals, means comprising a test relay for testing the trunks connected to the selected group of terminals, means polarizing said test relay in one direction to enable selection of a trunk in one of said two groups of trunks, means polarizing said test relay in the other direction to enable selection of a trunk in the other of said two groups of trunks, means for operating said relay responsive to the switch finding an idle trunk in the desired one of said groups of trunks, and means comprising said relay for terminating the automatic operation of said switch and for effecting seizure of the first idle trunk in a desired one of said groups of trunks.

4. In a telephone system, a selector switch comprising a bank of terminals divided into levels and a set of wipers for connecting with any set of terminals, means responsive to a train of impulses incoming to said switch for stepping the wipers into alignment with the terminals of the level corresponding to the number of impulses in the train, groups of trunks connected to said bank, means for advancing the wipers in any selected level to hunt for an idle trunk, a test relay and a test wiper for testing the trunk connected to any set of terminals upon engagement by said wipers, means for polarizing said test relay to render it operatively responsive to the engagement of said test wiper with a terminal connected to an idle battery potential of one polarity, means for polarizing said test relay to render it operatively responsive to the engagement of said test wiper with a terminal connected to an idle battery potential of the opposite polarity, and means responsive to directive impulses incoming to said switch for determining the direction in which said test relay is to be polarized during trunk hunting.

5. In a telephone system, a selector switch comprising a bank of terminals divided into levels and a set of wipers for connecting with any set of terminals, means responsive to a train of impulses incoming to said switch for stepping the wipers into alignment with the terminals of the level corresponding to the number of impulses in the train, groups of trunks connected to said bank, two of said groups being connected to terminals in one level, means for advancing the wipers in any selected level to hunt for an idle trunk, a test relay and a test wiper for testing the busy or idle condition of the trunk connected to any set of terminals in any selected level, an operating winding and a polarizing winding for said test relay, a control relay, a circuit including back contacts of said control relay and said polarizing winding for rendering said test relay operatively responsive to the engagement of said test wiper with a terminal connected to an idle battery potential of one polarity, a circuit including front contacts of said control relay and said polarizing winding for rendering said test relay operatively responsive to the engagement of said test wiper with a terminal connected to an idle battery potential of the opposite polarity, and means for operating said control relay.

6. In a telephone system and selector switch according to claim 5, a holding winding for said test relay, means including said test wiper and said holding winding for maintaining the energization of said test relay upon connection of a holding ground potential in place of the idle battery potential to the terminal engaged by said test wiper, and contacts on said control relay for controlling the connection of said holding winding in series with said test wiper so as to energize said holding winding in the same direction as its polarizing winding.

7. In a telephone system and selector switch according to claim 5, a holding winding for said test relay, means including said test wiper and said holding winding for maintaining the energization of said test relay upon connection of a holding ground potential in place of the idle battery potential to the terminal engaged by said test wiper, and means responsive to the operation of said test relay for effecting the deenergization of the polarizing and operating windings of said test relay after energization of said holding winding.

8. In a telephone system, a selector switch comprising a bank of terminals divided into levels and a set of wipers for connecting with any set of terminals, means responsive to a train of impulses incoming to said switch for stepping the wipers into alignment with the terminals of the level corresponding to the number of impulses in the train, groups of trunks connected to said bank, two of said groups being connected to terminals in one level, each of the trunks in one of said two groups being adapted to connect a battery potential of one polarity to its test terminal in said bank when idle and to connect a ground potential to its test terminal when busy, each of the trunks in the other of said two groups being adapted to connect a battery potential of the opposite polarity to its test terminal in said bank when idle and to connect a ground potential to its test terminal when busy, means for advancing the wipers in any selected level to hunt for an idle trunk, a test relay and a test wiper for testing the trunk connected to any set of terminals upon engagement of said terminals by said wipers, a control relay, means including front contacts of said control relay for polarizing said test relay to render it operatively responsive to the engagement of said test wiper with a terminal connected to an idle battery potential of one polarity, means including back contacts of said control relay for polarizing said test relay to render it operatively responsive to the engagement of said test wiper with a terminal connected to an idle battery potential of the other polarity, a release magnet for restoring said wipers to normal, a set of contact springs operated upon alignment of said wipers with a particular level for operating said release magnet without trunk hunting in said level, and means rendered effective by the selection of said level and release from said level for operating said control relay.

9. In a telephone system, a selector switch comprising a bank of terminals divided into levels and a set of wipers for connecting with any set of terminals, means responsive to a train of impulses incoming to said switch for stepping the wipers into alignment with the level corresponding to the number of impulses in the train, means for stepping the wipers into engagement with any set of terminals in any selected level, groups of trunks, a different two of said groups being connected to each of a plurality of levels, each of said trunks in all of said groups being arranged to connect ground potential to the associated test terminal in said bank when the trunk is busy, each of the trunks in one of the groups of each of said plurality of levels being arranged to connect a battery potential of one polarity to its test terminal in said bank when the trunk is idle, each of the trunks in the other of the groups of each of said plurality of levels being arranged to connect a battery potential of the other polarity to its test terminal in said bank when the trunk is idle, means comprising a test relay and a test wiper effective upon engagement with any set of terminals to test the trunk connected thereto, means for polarizing said test relay in one direction to render it operatively responsive to the engagement of said test brush with a terminal connected to an idle battery potential of one polarity, means for polarizing said test relay in the other direction to render it operatively responsive to the engagement of said test brush with a terminal connected to an idle battery potential of the other polarity, and means for rendering effective the one or the other of said polarizing means dependent upon in which the two groups of a selected one of said plurality of levels a trunk is to be selected.

10. In a telephone system and selector switch according to claim 9, said means for rendering effective the one or the other of said polarizing means consisting of a control relay, a set of contact springs operated upon alignment of said wipers with a particular level, means comprising a release magnet operated upon actuation of said contact springs in response to a first train of impulses incoming to said switch to restore the wipers to normal, means for operating said control relay responsive to said restoration to normal to render effective the second of said polarizing means, and means for maintaining the operation of said control relay during the selective response of the switch to the next train of impulses and during the advance of the wipers to select a trunk in the level corresponding to said next train of impulses.

11. In a telephone system, a selector switch comprising a bank of terminals divided into levels, a set of wipers including a test wiper, impulse controlled means for selectively advancing the wipers into alignment with any level, groups of trunks connected to said bank, means for automatically advancing the wipers in any level to hunt for an idle trunk in a group connected thereto, each of a plurality of said levels having terminals connected to two different groups of trunks, each trunk in one of the two groups in a level being arranged to connect a negative battery potential to its test terminal when idle, each trunk in the other of the two groups in a level being arranged to connect a positive battery potential to its test terminal when idle, each trunk of all groups arranged to connect ground potential to its test terminal when busy, a set of contact springs operated upon alignment of said wipers with a particular level, means including normally closed contacts of said springs for initiating the advance of the brushes in any level other than said particular level selected responsive to a first train of directive impulses, a test relay having a polarizing winding, an operating winding and a locking winding, means responsive to seizure of said switch for energizing said polarizing winding in the direction required for selection of an idle trunk in said one group of any level other than said particular level, a control relay, a release magnet for restoring the wipers to normal, means including contacts of said springs actuated upon selection of said particular level in response to the first train of directive impulses to restore the wipers to normal and operate said control relay, means rendered effective by the operation of said control relay for energizing said polarizing winding in the direction required for selection of an idle trunk in said particular level or in said other group of any other level selected in response to the next train of directive impulses incoming to said switch, a circuit for energizing said operating winding in the same direction as the polarizing winding upon engagement of said test wipers with an idle trunk in said one group of a level selected by the first train of impulses or upon engagement of said test wiper with an idle trunk in said other group of a level selected by the second train of impulses incoming to said switch, and means for energizing said locking winding upon connection of ground potential to the test terminal of a selected trunk in place of the idle battery potential.

12. In a telephone system and selector switch according to claim 9, a release magnet for restoring the wipers to normal, means for operating said release magnet at the end of a first train of impulses incoming to said switch to absorb said impulses, said means for rendering effective one or the other of said polarizing means comprising a control relay, a set of contact springs operatively associated with a particular level of said switch, a circuit for operating said control relay closed by the operation of said contact springs in response to a first train of impulses, and means for holding said control relay operated independent of said springs.

13. In a telephone system and a selector switch according to claim 9, two paths of access to said switch, said means for stepping the wipers into alignment with the level corresponding to the number of impulses in a train incoming to said switch being responsive to impulses incoming over either path of access, said means for rendering effective the one or the other of said polarizing means comprising a control relay, and means responsive to seizure of said switch over only one of said paths of access for operating said control relay.

14. In a telephone system and selector switch according to claim 9, two paths of access to said switch, said means for stepping the wipers into alignment with the level corresponding to the number of impulses in a train incoming to said switch being responsive to impulses incoming over either path of access, said means for rendering effective the one or the other of said polarizing means comprising a control relay and means responsive to seizure of said switch over only one of said paths of access for operating said control relay, a release magnet for restoring said wipers to normal, and a set of contact springs operated upon selection of a particular level in response to a first train of impulses incoming to said switch for operating said release magnet to restore said wipers thereby rendering said switch selectively responsive to the next train of impulses.

15. In a telephone system, two groups of trunks, a selector switch having access to said groups of trunks, each of the trunks in one of said groups having means associated therewith for connecting a positive idle battery potential to its test terminal in the bank of said switch, each of the trunks in the other of said groups having means associated therewith for connecting a negative idle battery potential to its test terminal in the bank of said switch, each trunk of both of said groups having means associated therewith for connecting ground potential to its test terminal in the bank of said switch when busy, said selector being arranged to test for idle battery potential of one polarity to select an idle trunk in one group and to test for idle battery potential of the other polarity to select an idle trunk in the other group.

16. In a signaling system, an automatic switch comprising a wiper set including two line wipers and a single test wiper, a terminal bank comprising terminal sets arranged in levels accessible to said wiper set, two groups of trunks terminated by the terminal sets in a given level of said bank, each of said trunks including two line conductors and a single test conductor, mechanism selectively operable to determine either one of said groups of trunks in said given level, means for initiating movement of said wiper set over the terminal sets in said given level, means governed by said mechanism for testing over said test wiper the test conductors of the trunks in the previously determined one of said groups, and means governed by said last-mentioned means for arresting movement of said wiper set, whereby said wiper set is controlled to select an idle trunk in said previously determined one of said groups.

17. In a signaling system, a line, an automatic switch associated with said line and comprising a wiper set including two line wipers and a single test wiper, a terminal bank comprising terminal sets arranged in levels accessible to said wiper set, two groups of trunks terminated by the terminal sets in a given level of said bank, each of said trunks including two line conductors and a single test conductor, mechanism operable to determine either one of said groups of trunks in said given level, means controllable over said line for selectively operating said mechanism, additional means controllable over said line for initiating movement of said wiper set over the terminal sets in said given level, means governed by said mechanism for testing over said test wiper the test conductors of the trunks in the previously determined one of said groups, and means governed by said last-mentioned means for arresting movement of said wiper set, whereby said wiper set is controlled to select an idle trunk in said previously determined one of said groups.

18. In a telephone system, a telephone station, a line extending to said station, an automatic switch comprising a wiper set including two line wipers and a single test wiper, means responsive to initiation of a call at said station for connecting said line to said switch, a terminal bank comprising terminal sets arranged in levels accessible to said wiper set, two groups of trunks terminated by the terminal sets in a given level of said bank, each of said trunks including two line conductors and a single test conductor, mechanism operable to determine either one of said groups of trunks in said given level, means controllable from said station over said line for selectively operating said mechanism, additional means controllable from said station over said line for initiating movement of said wiper set over the terminal sets in said given level, means governed by said mechanism for testing over said test wiper the test conductors of the trunks in the previously determined one of said groups, means governed by said last-mentioned means for arresting movement of said wiper set, whereby said wiper set is controlled to select an idle trunk in said previously determined one of said groups, and means responsive to the selection by said wiper set of said last-mentioned trunk for connecting said line to said wiper set.

MARCELLUS B. McDAVITT.